United States Patent [19]

Kim

[11] Patent Number: 5,006,498

[45] Date of Patent: Apr. 9, 1991

[54] ARTIFICIAL STONE WICK FOR A BURNER AND PROCESSES FOR THE PREPARATION THEREOF

[76] Inventor: Kwang-Shick Kim, #551, Dockpoong-7 Ri, Dongbu-Up, Kwangju-Gun, Kyungki-Do, Rep. of Korea

[21] Appl. No.: 341,643

[22] Filed: Apr. 21, 1989

[30] Foreign Application Priority Data

Apr. 23, 1988 [KR] Rep. of Korea ............... 4673/1988

[51] Int. Cl.$^5$ ..................... B01J 20/12; B01J 20/18
[52] U.S. Cl. ......................... 502/68; 44/519; 431/326; 502/407
[58] Field of Search ............ 502/2, 60, 68, 407; 431/302, 325, 326; 44/519, 540

[56] References Cited

U.S. PATENT DOCUMENTS

| | | | |
|---|---|---|---|
| 17,306 | 10/1902 | Andersen | 431/326 |
| 2,973,327 | 2/1961 | Mitchell et al. | 502/68 |
| 3,291,754 | 12/1966 | Hanisch et al. | 502/60 |
| 3,413,967 | 12/1968 | Hoock | 44/519 |
| 4,518,347 | 5/1985 | Sonetaka et al. | 431/325 |

FOREIGN PATENT DOCUMENTS

| | | | |
|---|---|---|---|
| 2042736 | 2/1987 | Japan | 502/60 |
| 2142915 | 6/1987 | Japan | 431/326 |
| 481929 | 3/1938 | United Kingdom | 44/540 |

*Primary Examiner*—Carl F. Dees
*Attorney, Agent, or Firm*—Mathews, Woodbridge & Collins

[57] ABSTRACT

An artificial stone wick material for a burner which comprising $SiO_2$ 7–21 weight percent, $Al_2O_3$ 2–5 weight percent, $Fe_2O_3$ 1–3 weight percent, CaO 50–27 weight percent, MgO 0.5–3 weight percent, $K_2O$ 0.5–3 weight percent, $Na_2O$ 0–2 weight percent, and $TiO_2$ 0–2 weight percent, and processes for preparing the artificial stone wick from the raw materials of clay, portland cement, and zeolite are disclosed.

3 Claims, 3 Drawing Sheets

FIG.3
(A) 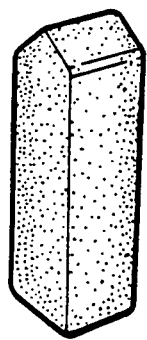
(B) 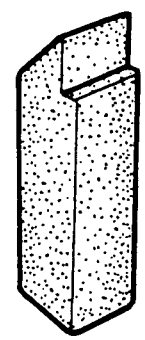
FIG. 4
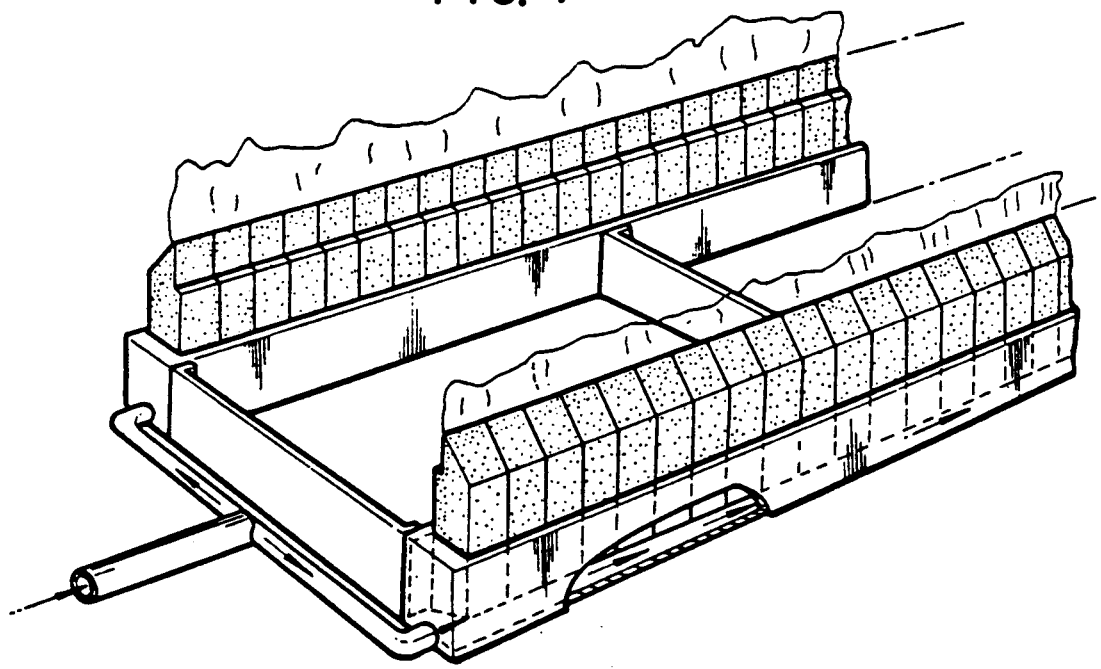

ARTIFICIAL STONE WICK FOR A BURNER AND PROCESSES FOR THE PREPARATION THEREOF

The invention relates to an artificial stone wick for burner and processes for the preparation thereof. In particular, the invention relates to artificial stone wicks for a liquid fuel burner and processes for the preparation thereof.

BACKGROUND OF THE INVENTION

Hiterto, the wicks for a burner using liquid fuel as energy sources have been made from a glass fiber, cotton fiber, or a mixed yarn of both. The Japanese utility model, Laid-open No. 52-157535 disclosed liquid fuel combustion wicks which composed of a combustion portion made from glass fiber, fuel absorption and transfer portion made from cotton or cotton staple fiber and the lower fuel oil immersed portion made from propylene resins. Korean utility model publication No. 85-1822 disclosed a wick made from the blended yarn of glass fiber and cotton fiber, whose combustion characteristics are improved by carbonizing the glass fiber in the combustion portion at high temperature, but at a temperature below the melting point of the glass fiber. The prior art described above contributed to the improvement of conventional wicks with respect to a decrease in smoke and carbon black and resulted in an increase in the combustion efficiency. However, combustion remained incomplete and the problems related thereto, such as the production of harmful gas, smoke, nuisance, and odor still remained.

The Korean patent application No. 84-1268, which was granted to the present inventor, teaches novel ceramic wicks for kerosene fuel burners in which the wick itself does not burn during the combustion. This disclosure opened an entirely new approach to the wick. As the wicks were made from artifical ceramics, mechanical and chemical wear of the wick was reduced to a minumum and the life span of the wicks was extended to semi-permanent. Furthermore, this wick contributed the reduction of smoke caused by incomplete combustion, and facilitated the realization of the economy of the fuel. In this prior art, a process is disclosed for preparing ceramic wicks for kerosene burners which comprised the steps of mixing the powder of portland cement with clay; heat treating the mixture at an elevated temperature; re-mixing the mixture thus obtained with charcoal powder and water to produce a paste; and, then, heat treating the mixture at high temperature. The charcoal powder provides an internal pore structure by which the liquid fuel may be transferred by capillary action, and plays a primary role in determining the absorption and transfer rate of the wick. But there are problems, such as the difficulties in handling charcoal powder, in mixing of the charcoal with water during the preparation stage, and in the unevenness and reduction of the pore space in the resulting ceramic wick.

SUMMARY OF THE INVENTION

Accordingly, the purpose of the present invention is to provide a solution to the problems raised by the prior art. The further purpose of the present invention is to provide a wick with higher heat efficiency, more uniform micropore structure and other improved characteristics and processes for preparing them in simplified steps and economic ways.

The present invention relates to a stone wick for burners which is the heat treated composition comprising a mixture of portland cement powder, dried clay, zeolite and water, whose final composition is in the range of weight percent of:

| | |
|---|---|
| $SiO_2$ | 7–21 |
| $Al_2O_3$ | 2–5 |
| $Fe_2O_3$ | 1–3 |
| CaO | 50–72 |
| MgO | 0.5–3 |
| $K_2O$ | 0.5–3 |
| $Na_2$ | 0–2 |
| $TiO_2$ | 0–2 |

Furthermore, the present invention relates to a process for preparing the artificial stone wicks for burners which comprising of the step of mixing the proper amount of portland cement powder, dried clay and zeolite, so as to the final chemical composition of the artificial stone is in the range of weight percent of:

| | |
|---|---|
| $SiO_2$ | 7–21 |
| $Al_2O_3$ | 2–5 |
| $Fe_2O_3$ | 1–3 |
| CaO | 50–72 |
| MgO | 0.5–3 |
| $K_2O$ | 0.5–3 |
| $Na_2O$ | 0–2 |
| $TiO_2$ | 0–2 | and heat treating the mixture at the temperature of 850°–1100° C. for 1 to 2 hrs., crushing the heat treated powder, remixing th crushed powder with water, and then forming the resulting paste to the desired wick form, drying and re-heating the form at the temperature of 850°–1100° C. for 1 to 2 hrs.

There is an alternative process for preparation for the artificial stone wick for burners, in which zeolite is added at a later stage, that is, just before the remixing, which may obtain a further improvement.

BRIEF DESCRIPTION OF THE DRAWINGS

FIG. 3 (A) and (B) show possible shapes and configurations of the artificial stone wicks of the present invention.

FIG. 4 is the schematic diagram showing the arrangement of artificial stone wicks in a burner.

In FIGS. 1 and 2, Z represents zeolite, P.C. is portland cement, C is clay and W is water.

DETAILED DESCRIPTION OF THE INVENTION

Portland cement is used as a starting raw material for the present invention and acts as the binder for all the components of artificial stone and forms the basic structure for the produced artificial stone.

Clay is used preferably in a dried and powdered form. clay may be substituted or supplemented by small quantities of Bentonite, if necessary, and clay prevents the artificial stone from eluting into the liquid fuel oil during the lifetime of combustion and immersion in the liquid fuel.

Zeolite used in the present invention may be natural or synthetic zeolite and provides the porosity in the artificial stone in accordance with the present invention. The minute porousness of the artificial stone of the present invention is greatly dependent on the nature and quantity of the zeolite used. Accordingly, the absorbency, retention and transfer characteristics of artificial stone depends greatly on the zeolite used. It is preferred, therefore, to crush the zeolite to particles in the range of 60–100mesh before mixing with other components.

Water acts as a lubricant and the proper amount is used so that the powdered components can be prepared in a slurry or paste state. The proper amount of water is usually directly proportional to the amount of portland cement used.

Further, the present invention may use as additional components such raw materials as small quantities of monazite to increase combustion efficiency or zircon to induce the catalytic effect and improve the heat resisting character of the artificial stone of the present invention.

Figure 1:
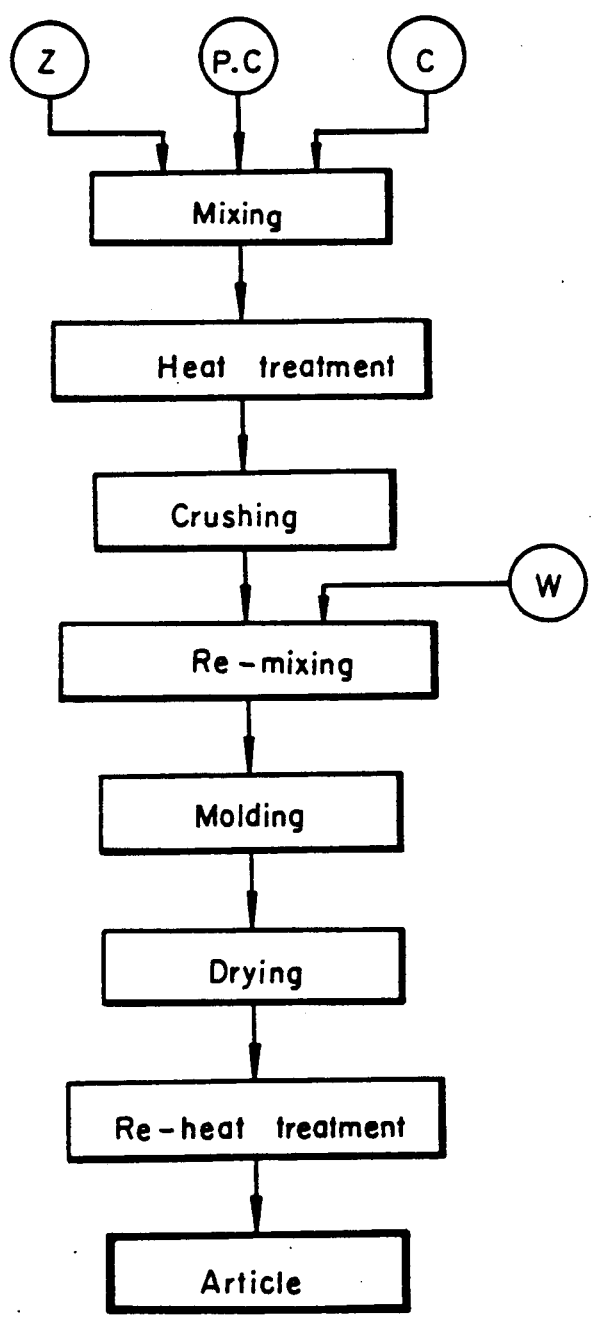
FIG. 1 is a diagram showing each step of a process for preparing the artificial stone wick of the present invention.
Figure 2:
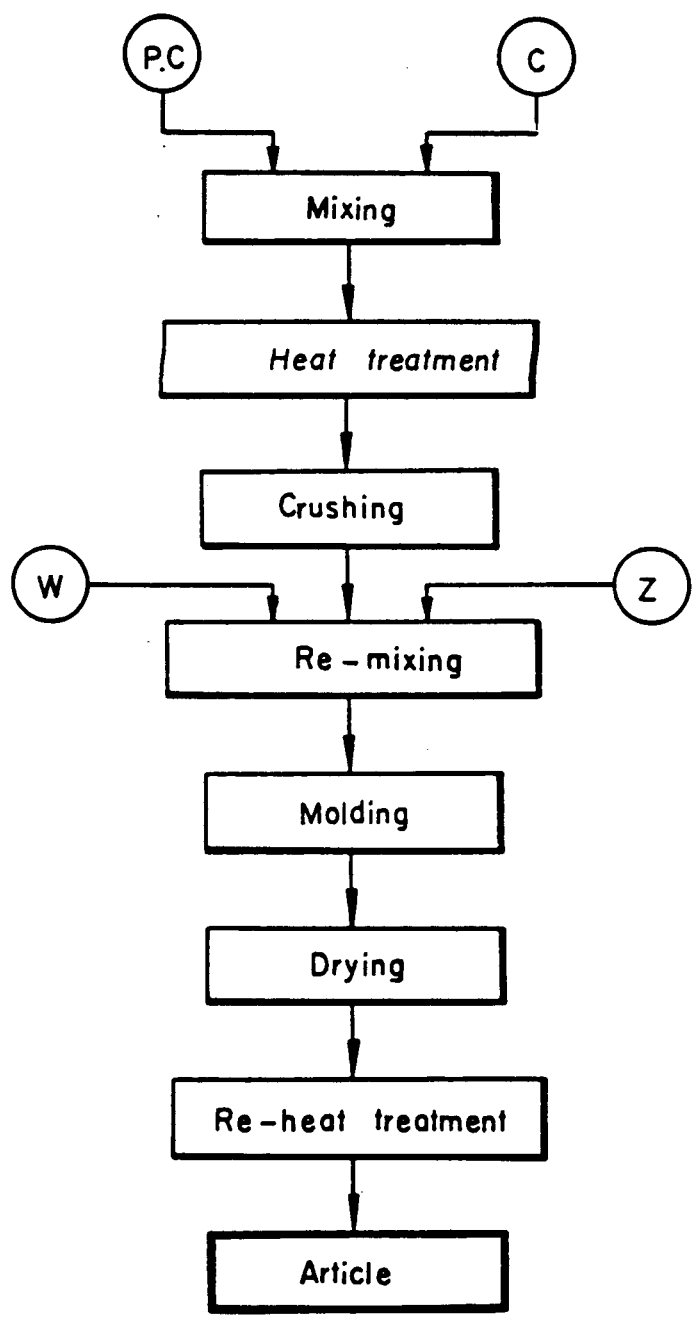
FIG. 2 is a diagram showing each step of an alternative process for preparing the artificial stone wick of the present invention.

The process for preparing the artificial stone wick is further described in accordance with FIG. 1 and FIG. 2.

The artificial stone wick of the present invention, is prepared by mixing the 30–50 weight percent of portland cement powder, 30 to 50 weight percent of dried clay powder, and 20–40 weight percent of zeolite, heat treating the mixture at 850° to 1100° C., crushing, adding the proper amount of water to form a slurry or paste of the mixed powder, then molding. The molded slurry or paste is then again heat treated at the temperature of 850° to 1100° C.

It is preferred to first mix the portland cement powder and dry clay powder. This mixture may be first be heat treated at a range of 850°–1100° C. for 1 to 2 hrs. without zeolite as shown in FIG. 2 and then subjected to the subsequent steps as set out in FIG. 2.

The crushing steps may be carried out by any manner known to the art and the crushed powder mixture would then be combined with the proper amount of water and molded and formed into the desired shape, such as one of those shown in FIG. 3. After a second heat-treatment step, the chemical composition should generally coincide with the following chemical composition by weight percent:

| | | |
|---|---|---|
| | $SiO_2$ | 7–21 |
| | $Al_2O_3$ | 2–5 |
| | $Fe_2O_3$ | 1–3 |
| | $CaO$ | 50–72 |
| | $MgO$ | 0.5–3 |
| | $K_2O$ | 0.5–3 |
| | $Na_2O$ | 0–2 |
| | $TiO_2$ | 0–2 |

The molded wick may have the shape or configuration shown in FIG. 3 and then be arranged in a burner as shown in FIG. 4. However, the shape of the artificial stone wick is not intended to be limited to the examples shown in the FIG. 3 nor is the arrangement intended to be limited to the embodiment shown in FIG. 4. Rather, the present invention is intended to be extended to analogous forms and arrangements.

When the amount of portland cement powder used is less than about 30 weight percent, an artificial stone wick may elute into the liquid fuel. At the same time, a level of more than about 50 weight percent of portland cement powder may cause a decrease in heat resistance characteristics of the artificial stone wick of the present invention. Therefore, the preferable range for the portland cement added to the composition is the amount ranging between about 30 to about 50 weight percent.

When the proportion of the clay is less than about 30 weight percent of the stone composition, the absorption characteristic of the stone wick decreases. However, at a level of more than about 50 weight percent, the clay shows a tendency to elute into the fuel. Therefore, the preferred range of the clay is from about 30 to about 50 weight percent.

When zeolite is present at a level of less than about 20 weight percent, the absorption and transfer of fuel by the resulting stone wick decreases. At a level of more than about 40 weight percent, however, the absorption and transfer of fuel become too rapid. In some cases, this may cause the loss of fuel and control difficulties which result in a loss of economy. Therefore, the preferred proportion of zeolite is within a range between about 20 to about 40 weight percent.

The artificial stone wick according to the present invention is prepared in a rather straightforward process, and has a semi-permanent life span. Further, the present artificial stone wick has resulted in 20 to 30 percent economy in fuel consumption as a result of the more complete combustion of fuel. Further, since the artificial stone wick of the present invention enables fuel to burn without producing carbon black, it therefore provides a comfortable atmosphere in the house interior when it is used in a home. Another advantage of the artificial stone wick of the present invention is illustrated in Table 2, which is selfexplanatory.

Hereinafter, the embodiment of the present invention is further illustrated by the following examples.

EXAMPLE 1

350 grams of portland cement powder, 350 grams of dry clay and 300 grams of powdered zeolite (80 mesh) were mixed thoroughly using a conventional mixer. The powder mixture was heat treated at a temperature of 1000° C. for 1 hour in an electrical furnace, and the heat treated mixture thus obtained was crushed to powder and re-mixed with proper amounts of water to make a paste. The paste was molded into the desired shape and dried at room temperature and then re-heated again to a temperature of 1000° C. for 1 hour in the electrical furnace. The test piece thus obtained was analyzed and the composition is as shown in the Table 1.

TABLE 1

| Component | Weight percent |
|---|---|
| $SiO_2$ | 9.38 |
| $Al_2O_3$ | 3.26 |
| $Fe_2O_3$ | 1.75 |
| $CaO$ | 68.5 |
| $MgO$ | 0.94 |
| $K_2O$ | 0.69 |
| $Na_2O$ | 0.08 |
| $TiO_2$ | 0.18 |
| Ig. Loss and Others | 15.22. |

The test piece obtained from the Example 1 was comparison tested in the kerosene burner containing 3 liters of kerosene. As is clear from the following Table 2, the test piece wick of the Example 1 is superior in wear-resistance, complete combustion, and combustion rate, compared with a wick of the same physical configuration made from cotton.

TABLE 2

|  | artificial stone wick of Example 1 | conventional cotton wick |
| --- | --- | --- |
| burning period for 3 liters of kerosene | about 19 hrs. | about 14 hrs. |
| wearing of wick | none observed | slight wear was observed at the top of wick |
| smoke | none | produced smoke especially during ignition |
| time required to boil 1 liter of water | 5 minutes | 8 minutes |

EXAMPLE 2

300 grams of portland cement powder and 300 grams of dry clay were mixed thoroughly using a conventional mixer. The powdered mixture was heat treated at a temperature of 1000° C. for 1 hour in an electrical furnace. The heat treated mixture thus obtained was crushed to a powder. To this powder 120 grams of powdered zeolite (80 mesh), 20 grams monazite, 15 grams of zircon and about 300 milliliters of water added and the powder was re-mixed to make the paste. The paste was molded to the desired shape of 8×12×20 millimeters as shown in FIG. 3 (A) and dried or aged at room temperature, then heat treated again at the temperature of 1000° C. for 1 hour in the electrical furnace. The test piece thus obtained was used as a stone wick in a kerosene burner and obtained the excellent results similar to those of Example 1.

The test piece obtained from Example 2 was comparison tested in the kerosene burner containing three liters of kerosene. As is clear from the following Table 3, the test piece wick of the Example 2 is superior in wear-resistance, complete combustion, and combustion rate, compared with a wick of the same physical configuration made from cotton.

TABLE 3

|  | artificial stone wick of Example 2 | conventional cotton wick |
| --- | --- | --- |
| burning period for 3 liters of kerosene | about 20 hrs. | about 14 hrs. |
| wearing of wick | none observed | slight wear was observed at the top of wick |
| smoke | none | produced smoke especially during ignition |

What is claimed is:

1. An artificial stone wick for a burner comprising the heat treated composition which comprises a mixture of portland cement powder, dried clay, zeolite and water, and whose final composition is in the range of $SiO_2$ 7-21 weight percent, $Al_2O_3$ 2-5 weight percent, $Fe_2O_3$ 1-3 weight percent, CaO 50-27 weight percent, MgO 0.5-3 weight percent, $K_2O$ 0.5-3 weight percent, $Na_2O$ 0-2 weight percent, and $TiO_2$ 0-2 weight percent.

2. The process of preparing an artificial stone wick comprising the steps of: mixing portland cement powder, dried clay powder and zeolite; heat treating the mixed powder; crushing the heat treated powder; re-mixing the crushed powder with water; molding to a desired form; drying the molded powder; and, re-heat treating to form an artificial stone wick.

3. The process of preparing an artificial stone wick comprising the steps of: mixing portland cement powder and dried clay powder; heat treating the mixed powder; crushing the heat treated powder; mixing the crushed powder wih zeolite and water; molding to a desired form; drying the molded powder; and, re-heat treating to form an artificial stone wick.

* * * * *